Patented May 26, 1942

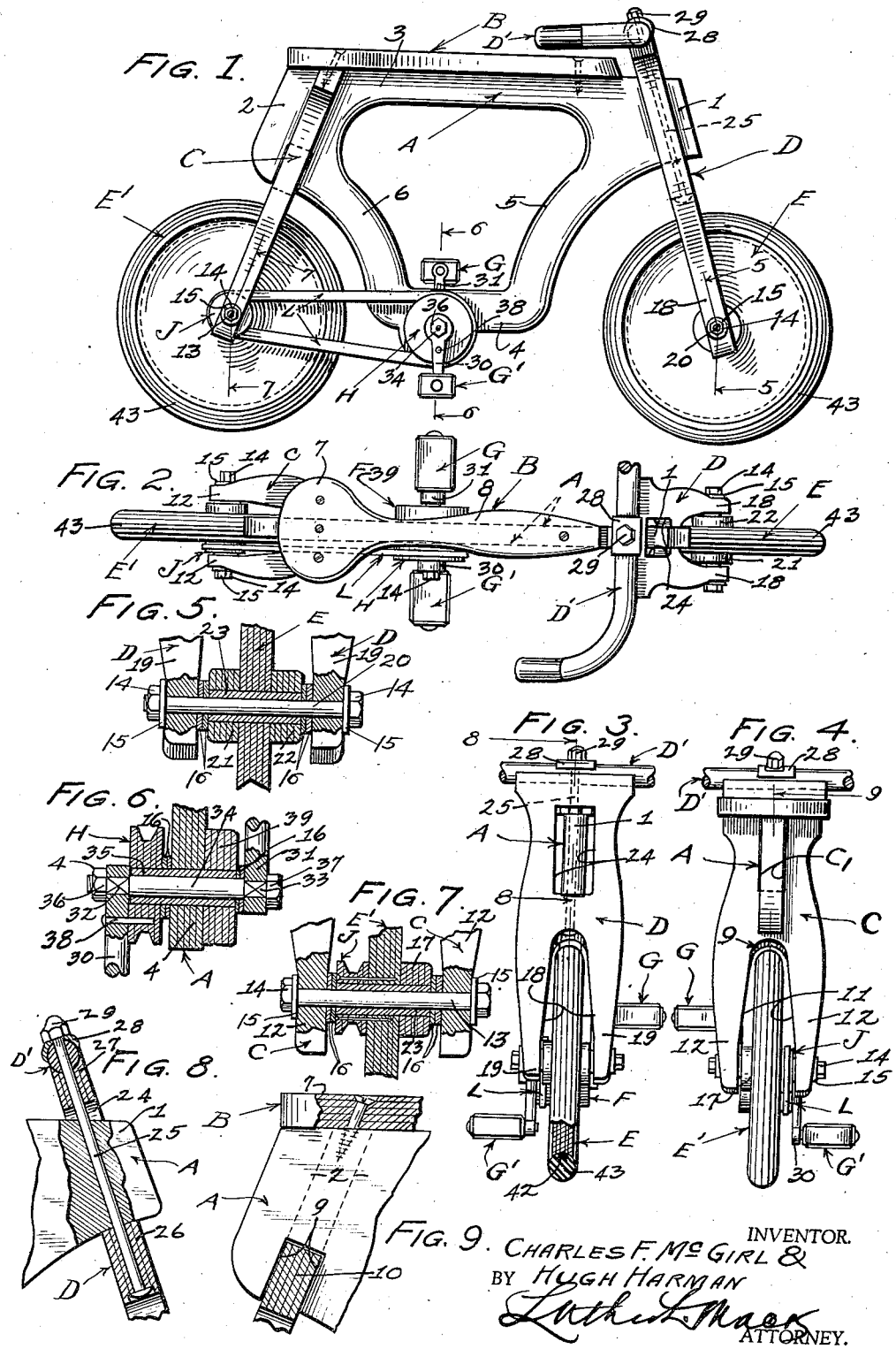

2,284,333

UNITED STATES PATENT OFFICE 2,284,333

BICYCLE

Charles F. McGirl, Van Nuys, and Hugh Harman, Los Angeles, Calif.

Application September 7, 1940, Serial No. 355,766

8 Claims. (Cl. 280—261)

This invention relates to and has for an object the provision of a simple, economical and yet sturdy bicycle adapted primarily for use by small children and constructed entirely of wood—preferably plywood—and consisting of members rigidly secured together in such a manner as to provide for durability and abuse, and capable of being sold within the low price range of such articles.

An object of this invention is to provide a bicycle having a frame formed of a single piece of plywood formed of a plurality of reversely grained laminations and of sufficient thickness to provide a maximum strength, rigidity and durability, front and rear forks respectively pivotally and stationarily supported on said frame and also formed of plywood, wheels carried by said forks, pedals operatively supported on said frame and belt connected with the rear wheel, a rigid seat member on the top of and for reinforcing and bracing said frame laterally, and the usual handle bars associated with the front fork for steering the vehicle.

Other objects consist in the particular and peculiar construction and form of the parts of the frame and the manner in which they are fastened together for the purpose of strengthening the structure for use and against abuse, as will appear in the description of our improvements hereinafter, as well as in the drawing forming a part hereof, to which reference is made in the consideration of our invention.

In said drawing we have shown a preferred form of invention subject to modification, within the scope of the appended claims, without departing from the spirit of our invention, and in which:

Fig. 1 is a side elevation of a bicycle embodying our improvements;

Fig. 2 is a top plan view of the same;

Fig. 3 is a front elevation;

Fig. 4 is a rear elevation;

Fig. 5 is a transverse section of the front or pilot wheel and its support on line 5—5 of Fig. 1;

Fig. 6 is a transverse section of the pedals and their support on line 6—6 of Fig. 1;

Fig. 7 is a transverse section of the rear wheel and its support on line 7—7 of Fig. 1;

Fig. 8 is a sectional elevation of the pilot wheel mounting on line 8—8 of Fig. 3; and Fig. 9 is a fragmentary section, in elevation, of the rigid rear fork, frame and seat on line 9—9 of Fig. 4.

Briefly described, the form of vehicle shown includes a plywood frame member A having a horizontally disposed seat B attached to its upper edge, a rigid rear fork C extending downwardly and rearwardly from the bottom of seat B and attached to the rear portion of frame A, a front fork D swivelled on the front portion of frame A and extending downwardly and forwardly, wheels E and E' carried, respectively, by forks D and C, pedals G and G' rotatably carried by a wooden boss F fixedly held on a central portion of frame A, and pulleys H and J rotatably supported on boss F and wheel E' and operatively connected as by means of a continuous belt L, all as shown in Fig. 1.

Frame A is formed of a single piece of plywood of sufficient thickness to provide ample strength and durability and is of skeleton character with front and rear portions 1 and 2, respectively, a top portion 3, a bottom portion 4 and inclined portions 5 and 6 connecting said front and rear portions with said bottom portion and providing an opening of substantial size formed by the removal of a substantial portion of the sheet from which the frame is formed and thereby eliminating a substantial amount of weight from the frame without in any respect weakening the same.

The seat member B is horizontally disposed on the upper edge of portion 3 of the frame and preferably extends almost the length thereof so as to not only provide a seat for a rider but also serve to reinforce the frame laterally. Thus, member B has a rounded seat portion at the rear end which is nailed, screwed or otherwise attached to the portion 3 of the frame and also to the upper end of fork C and a narrowed portion 8 extending forwardly of the seat and suitably contoured at its edges to provide comfort for the rider.

The rear fork C is slotted at C' to receive the portion 2 of the frame while the portion 3 is slotted upwardly from its lower edge at 9 to receive a central portion as at 10 of fork C, as shown in Figs. 4 and 9, thus providing an interlocking joint between frame A and fork C, capable of further strengthening as by means of glue, dowels, screws, brads or the like. Fork C also has a crotch 11 formed between spaced furcations 12, 12 whereby to receive and rotatably support a rear wheel E'. As shown in Fig. 7, wheel E' is also formed of plywood, as are forks C and D, and is mounted on a stationary axle 13, the end portions of which are held in the lower portions of the furcations 12, 12 and are provided with nuts 14 and washers 15 on the outer sides of said furcations and one or more washers 16 on the inner sides thereof. Wheel E' has the pulley J fixed to its outer side and a boss 17 on its inner side to compensate for the width of the pulley and center the wheel between the furcations 12.

As shown in Figs. 3 and 5, the front or pilot wheel E is mounted in the crotch 18 of fork D between furcations 19, 19 on a stationary axle 20 which, like wheel E', is provided with nuts 14 and washers 15 on the outer sides of furcations 19 and washers 16 on the inner sides thereof while the wheel has bosses 21 and 22 on its opposite sides for centering the wheel in the crotch of the fork. Both of the wheels E and E' have oilless bushings 23 extending completely therethrough so that the wheels will turn freely and frictionless on their axles.

The front fork D has an opening 24 above the crotch 18 for receiving the front portion 1 of frame A, as shown in Figs. 1 and 3, and is of sufficient width to permit the free swivelling of the fork on the frame for making a turn of minimum radius. The fork D is swivelled on an inclined rod 25 (see Fig. 8) which rotates in the portion 1 of frame A and is fixed at its lower end in a portion 26 of fork D and in an upper portion 27 of said fork. The fork portion 27 is concave at its upper edge so as to receive a handle bar D', through which the upper portion of rod 25 is extended and a saddle 28 and nut 29 are held on the upper end of said rod for holding all of said members in operative relationships.

The lower horizontal portion 4 of frame A serves as a support for the pedals G and G', a cross section of which is shown in Fig. 6. Said pedals are rotatably held on crank arms 30 and 31, respectively, which are fixed against rotation to portions 32 and 33 of a crank shaft 34 journalled in an oilless bushing 35 carried by said frame, and nuts 36 and 37 are held on the ends of said shaft for retaining the crank and pedal unit in operative position. One of the arms, as at 30, is attached as by means of a nail or pin 38 to the pulley H on one side of frame A and a boss 39 is fixed by suitable means to the opposite side of the frame portion 4 for properly centering the pedals and alining the pulley H with the rear wheel pulley J so that the belt L which operatively connects said pulleys will freely run and serve to drive the rear wheel E' when the pedals G and G' are operated by the rider. Washers 16 may also be interposed between pulley H and frame A and between arm 31 and boss 39.

Wheels E and E' are formed of plywood and are turned with concave grooves 42 on their peripheries for receiving and holding rubber tires 43 of circular cross section in place on the wheels in a manner similar to conventional bicycle wheels.

Thus, it will be noted that the entire structure of the bicycle, even including the pedals G and G' and the arms 30 and 31 are formed of wood, and preferably of plywood, thereby insuring a minimum cost of manufacture and a maximum rigidity, strength and durability under conditions of ordinary use as well as abuse, eliminating all complicated and costly parts usually provided in bicycles even of the toy type, and rendering the entire structure capable of ready and easy assembly and disassembly for the purpose of cleaning, repairing, shipping or substitution of worn or defective parts.

What we claim is:

1. A bicycle comprising: an integral flat frame member disposed edgewise and cut away interiorly to provide connected marginal portions, a combined seat and reinforcing member disposed horizontally on and attached to the upper edge of said frame member, said frame member having a top portion, front and rear extensions, and a bottom portion connected with said front and rear extensions by inclined portions, a front fork disposed edgewise of and pivotally supported on the front extension of said frame and extended downwardly and forwardly, a rear fork also disposed edgewise of and fixed to the rear extension of said frame and extended downwardly and rearwardly, traction wheels rotatably supported in the crotches of said forks and underlying said front and rear frame extensions, respectively, a pedal operated crank rotatably mounted on the bottom portion of said frame, and means operatively connecting said crank with said rear wheel.

2. A bicycle comprising: a skeleton frame, seat, front and rear forks, front and rear traction wheels formed of plywood and a pedal operated crank, said frame being disposed edgewise and provided with a seat on its upper edge and front and rear extensions overlying said wheels, respectively, and a supporting portion for said cranks disposed between said wheels, said front fork being pivotally supported on said front frame extension and said rear fork being fixedly supported on said rear frame extension, and transmission means operatively connecting said rear wheel and said crank, said front and rear wheels being rotatably supported on said front and rear forks, respectively, axles detachably carried by the lower portions of said forks, bushings carried by said wheels for receiving said axles, and bosses axially affixed to said wheels and the crank supporting portion of said frame for alining said wheels with said frame.

3. A bicycle comprising: an integral frame member disposed edgewise, a combined seat and reinforcing member disposed horizontally on and attached to the upper edge of said frame member, said frame member having front and rear extensions and a bottom portion connected with said front and rear extensions by inclined portions, a front fork pivotally supported on said front extension and extended downwardly and forwardly, a rear fork fixed to said rear extension and extended downwardly and rearwardly, traction wheels rotatably supported in the crotches of said forks and underlying said front and rear frame extensions, respectively, a pedal operated crank rotatably mounted on the bottom portion of said frame, and means operatively connecting said crank with said rear wheel, said front fork having an opening for receiving said front frame extension, a hinge rod extended through portions of said front fork above and below said opening, and a handle bar attached to the upper extremity of said rod and said front fork, for guiding the vehicle.

4. A bicycle comprising: a frame member disposed edgewise, a combined seat and reinforcing member disposed horizontally on and attached to the upper edge of said frame member, said frame member having front and rear extensions and a bottom portion connected with said front and rear extensions by inclined portions, a front fork pivotally supported on said front extension and extended downwardly and forwardly, a rear fork fixed to said rear extension and extended downwardly and rearwardly, traction wheels rotatably supported in the crotches of said forks and underlying said front and rear frame extensions, respectively, a pedal operated crank rotatably mounted on the bottom portion of said frame, and means operatively connecting said crank with said rear wheel, said rear frame extension and said rear fork each being slotted to receive portions of the other for providing an interlocking joint therebetween so as to rigidly support said rear fork on said frame.

5. A bicycle comprising: a frame member disposed edgewise, a seat disposed horizontally on and attached to the upper edge of said frame member, said frame member having front and rear extensions and a bottom portion connected with said front and rear extensions by inclined portions, a front fork pivotally supported on said front extension and extended downwardly and forwardly, a rear fork fixed to said rear extension and extended downwardly and rearwardly, traction wheels rotatably supported in the crotches of said forks and underlying said front and rear frame extensions, respectively, a pedal operated crank rotatably mounted on the bottom portion of said frame, and means operatively connecting said crank with said rear wheel, said front fork having an opening for receiving said front frame extension, a hinge rod extended through portions of said front fork above and below said opening, and a handle bar attached to the upper extremity of said rod and said front fork, for guiding the vehicle, said rear frame extension and said rear fork each being slotted to receive portions of the other for providing an interlocking joint therebetween so as to rigidly support said rear fork on said frame.

6. A bicycle comprising: an integrally formed frame disposed edgewise with an opening therein and formed with an upper portion, a bottom portion, front and rear end portions, a horizontal bottom portion and front and rear inclined portions connecting said end portions, respectively, with said bottom portion, a horizontal seat attached to the top edge of said upper portion, a downwardly and forwardly inclined front fork pivotally held on said front end portion and provided with a handle bar, a pilot wheel carried by said front fork, a downwardly and rearwardly inclined rear fork rigidly attached to said rear end portion and having its upper end underlying said seat, a driving wheel carried by said rear fork, an operating crank supported on said bottom portion, and means for operatively connecting said crank with said driving wheel.

7. A bicycle comprising: a frame member disposed edgewise, a seat disposed horizontally on and attached to the upper edge of said frame member, said frame member being cut away to provide an enlarged opening marginally bounded by a top portion, front and rear extensions, a bottom portion and inclined portions connecting said extensions with said bottom portion, a front fork pivotally supported on said front extension and extended downwardly and forwardly, a rear fork fixed to said rear extension and extended downwardly and rearwardly, traction wheels rotatably supported in the crotches of said forks and underlying said front and rear frame extensions, respectively, a pedal operated crank rotatably mounted on the bottom portion of said frame, and means operatively connecting said crank with said rear wheel, axles stationarily and detachably held in the lower portions of said forks, and bushings carried by said wheels to receive said axles.

8. A bicycle comprising: a one-piece frame member of flat cross section disposed edgewise and formed of plywood, a seat disposed horizontally on and attached to the upper edge of said frame member, said frame member being of skeleton form with an enlarged opening bounded by a top portion, front and rear extensions, a bottom portion and inclined portions connecting said extensions with said bottom portion, a front fork pivotally supported on said front extension and extended downwardly and forwardly, a rear fork fixed to said rear extension and extended downwardly and rearwardly, said forks also being of integral character and disposed transversely of said frame, traction wheels rotatably supported in the crotches of said forks and underlying said front and rear frame extensions, respectively, a pedal operated crank rotatably mounted on the bottom portion of said frame, means operatively connecting said crank with said rear wheel, and means on said wheels and on said frame for alining said wheels with said frame.

CHARLES F. McGIRL.
HUGH HARMAN.